UNITED STATES PATENT OFFICE.

HENRY VAIL DUNHAM, OF BAINBRIDGE, NEW YORK, ASSIGNOR TO NACIREMA CHEMICAL COMPANY, A CORPORATION OF VERMONT.

ART OF CONVERTING PHOSPHORITES.

1,076,200. Specification of Letters Patent. Patented Oct. 21, 1913.

No Drawing. Application filed September 14, 1911. Serial No. 649,283.

*To all whom it may concern:*

Be it known that I, HENRY V. DUNHAM, a citizen of the United States, residing at Bainbridge, in the county of Chenango and State of New York, have invented or discovered certain new and useful Improvements in the Art of Converting Phosphorites, of which the following is a specification.

This invention relates to the treatment of phosphorites or phosphate rock to render the same suitable for agricultural purposes and has for its object so to treat the phosphate rock by an inexpensive process that the treated product will contain a large percentage of citrate soluble phosphate which is suitable for plant life and which is known in the art as available phosphate.

It is well known that phosphate exists in natural phosphorites or phosphate rock in a form not available for plant life and that such natural phosphate must first be made available by some chemical process of treatment before it is suitable for agricultural purposes. Many attempts have been made to secure a large percentage of available phosphate, as, for instance, by adding to the finely ground rock certain salts and then heating the mixture to varying degrees in a blast furnace or other heating furnace. In most of these attempts to secure a high available content of "citrate soluble" or dilute citric acid soluble phosphate from the insoluble phosphorites, salts such as sodium sulfate or sodium carbonate or a mixture of these have been employed, for example as shown in my copending application 649,326, filed concurrently herewith. These processes so far as is known have never come into practical commercial use for the reason that the salts also act as a flux to a greater or less extent on the phosphorites, thus causing a considerable amount of fusion to take place on heating. Owing to the liability of the mixtures of phosphorites and converting salts to fuse it has been found impossible to utilize such high temperatures as would result in the conversion of a large amount of the insoluble phosphate into available phosphate. The disadvantages referred to above are avoided in accordance with the present invention by utilizing in conjunction with such salts or other suitable reagent a suitable material which will enable a much higher temperature to be obtained without fusion and which material I term a non-flux. Of a number of such materials with which I have experimented I find the most suitable to be alumina prepared from bauxite or clay since not only does the alumina act as a non-flux but it also assists in converting the insoluble phosphorites into available phosphates and in fact can be used in some cases without the salts or other reagent for the purpose of conversion.

The proportion of alumina will vary more or less, depending upon the composition of the phosphate rock employed, but I find that in some cases a small percentage, for example 5%, is sufficient, while in other cases as much as 15% may be necessary.

In carrying this invention into effect the phosphate rock is first ground to about 80 or 100 mesh and the salts or other reagent, for example, sodium sulfate, which may be used in the proportion of about 12% to 15%, of the weight of the phosphate employed and the non-flux (preferably alumina, as above indicated) is then added preferably in conjunction with a considerable amount of water. The amount of alumina preferably employed varies considerably with the amount of sodium salts (sodium sulfate) employed, and also varies depending upon the nature of the phosphate rock employed, particularly the proportions and character of the materials other than tricalcium phosphate, contained in said rock. The mixture of rock, salts and non-flux and water is then calcined by being subjected to a high heat depending somewhat on the grade of rock used but preferably to a white heat; and this heating treatment is continued for about one hour, the length of time of the heating treatment depending somewhat upon the quality or grade of rock being treated. After the mixture has been properly calcined it is removed from the furnace, and when it has cooled it is ground to a fine powder of from 80 to 100 mesh. It is then ready to be applied to the soil or mixed with other ingredients which are generally used in the manufacture of fertilizers.

By the foregoing process phosphorites may be converted into suitable condition for use as fertilizers at very much less expense than is involved in the usual process of conversion, owing to the greater amount of phosphate rendered available by the addition of the non-flux. The product of this process while "available," that is to say soluble in ammonium citrate solution of the official strength, (1.09 specific gravity), is not soluble in water.

The term "available," as used in the specification and claims, is used in the same sense in which it is ordinarily used in the fertilizer industry, namely, that the phosphoric acid compounds are soluble in a neutral solution of ammonium citrate, but are not soluble in pure water.

I am aware that sodium chlorid has previously been used with phosphate rock to produce sodium phosphate, and I disclaim the use of sodium chlorid in this process, for the reason that my experiments have demonstrated that sodium chlorid is far less suitable in the production of available phosphate from phosphate rock than is sodium sulfate, or a mixture of sulfate and carbonate.

Having thus described my invention I claim and desire to secure by Letters Patent:

1. A process of converting the phosphoric acid of phosphate rock into the available condition in a single operation, which comprises producing an intimate mixture of phosphate rock, a salt of an alkali metal capable of converting said phosphate into a form in which it is soluble in ammonium citrate, but insoluble in water, and a sufficient amount of alumina to prevent fusion of the mixture, and then heating the mixture to substantially a white heat until said conversion is accomplished, substantially as described.

2. A process of converting the phosphoric acid of phosphate rock into the available condition in a single operation, which comprises producing an intimate mixture of phosphate rock, a fusible alkali metal salt capable of converting said phosphate into citrate-soluble, but not water-soluble condition, and a sufficient amount of a "non-flux" to prevent fusion of the mixture, and then heating the mixture to a white heat until said conversion is accomplished, substantially as described.

3. A process of converting the phosphoric acid of phosphate rock into the available condition, which comprises producing an intimate mixture of phosphate rock, a sufficient amount of a fusible alkali metal salt to convert said phosphate into a form in which it is soluble in ammonium citrate but insoluble in water, and a sufficient amount of alumina to prevent fusion of the mixture, by mixing said materials in the presence of sufficient water to produce a plastic mass, and then heating the mixture to a white heat until said conversion is accomplished, substantially as described.

4. A process of converting the phosphoric acid of phosphate rock into the available condition, which comprises producing an intimate mixture of phosphate rock, a salt of an alkali metal in amount sufficient to convert said phosphate into a citrate-soluble, but not water-soluble condition, and a sufficient amount of alumina to prevent any substantial amount of fusion of the mixture, and then heating the mixture to a white heat for about an hour.

In testimony whereof I affix my signature, in presence of two witnesses.

HENRY VAIL DUNHAM.

Witnesses:
A. A. DUNHAM,
R. A. WILCOX.